(12) United States Patent
Chapman et al.

(10) Patent No.: US 11,866,375 B2
(45) Date of Patent: Jan. 9, 2024

(54) HONEYCOMB BODY MANUFACTURING METHODS

(71) Applicant: CORNING INCORPORATED, Corning, NY (US)

(72) Inventors: Thomas Richard Chapman, Painted Post, NY (US); Patrick David Tepesch, Corning, NY (US); Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 523 days.

(21) Appl. No.: 17/058,507

(22) PCT Filed: May 30, 2019

(86) PCT No.: PCT/US2019/034562
§ 371 (c)(1),
(2) Date: Nov. 24, 2020

(87) PCT Pub. No.: WO2019/232153
PCT Pub. Date: Dec. 5, 2019

(65) Prior Publication Data
US 2021/0198153 A1    Jul. 1, 2021

Related U.S. Application Data

(60) Provisional application No. 62/678,778, filed on May 31, 2018.

(51) Int. Cl.
*C04B 35/64* (2006.01)
*C04B 38/06* (2006.01)
(Continued)

(52) U.S. Cl.
CPC ............ *C04B 35/64* (2013.01); *B28B 11/243* (2013.01); *B28B 11/248* (2013.01);
(Continued)

(58) Field of Classification Search
CPC .......................... C04B 38/0006; C04B 38/068
(Continued)

(56) References Cited

U.S. PATENT DOCUMENTS 8,808,613 B1     8/2014  Yamayose
2007/0262498 A1* 11/2007 Saijo ................... F27D 5/0006
                                                           264/630

(Continued)

FOREIGN PATENT DOCUMENTS

CN         101045634 A    10/2007
CN         101678253 A     3/2010
(Continued)

OTHER PUBLICATIONS

Birol et al., "Processing of graphite-based sacrificial layer for microfabrication of low temperature co-fired ceramics", Sensors and Actuators A: Physical, vol. 130-131, Aug. 14, 2006, pp. 560-567.
(Continued)

*Primary Examiner* — Erin Snelting
(74) *Attorney, Agent, or Firm* — Daniel J. Greenhalgh

(57) ABSTRACT

Methods of firing ceramic-forming honeycomb bodies are disclosed that include heating the honeycomb bodies and blocking furnace gases from flowing through the honeycomb body by placing a layer selected from the group consisting of a graphite layer, a graphite-containing layer, an activated carbon layer, or an amorphous carbon layer adjacent an endface of the honeycomb body. Heating removes organic pore-forming material and graphite pore-forming material in the honeycomb body. The layer oxidizes to form a porous layer after firing to a first temperature, and furnace gases flow through the honeycomb body.

20 Claims, 7 Drawing Sheets

(51) Int. Cl.
    *B28B 11/24*     (2006.01)
    *C04B 38/00*     (2006.01)
    *C04B 35/478*     (2006.01)

(52) U.S. Cl.
    CPC ........ *C04B 38/0006* (2013.01); *C04B 38/068* (2013.01); *C04B 35/478* (2013.01)

(58) Field of Classification Search
    USPC ................................ 264/671–673, 605–609
    See application file for complete search history.

(56) References Cited

U.S. PATENT DOCUMENTS

| | | |
|---|---|---|
| 2008/0116621 A1 | 5/2008 | Brennan et al. |
| 2009/0298670 A1 | 12/2009 | Murtagh et al. |
| 2010/0130352 A1 | 5/2010 | Dabich et al. |
| 2011/0127699 A1 | 6/2011 | Vayansky et al. |

FOREIGN PATENT DOCUMENTS

| | | |
|---|---|---|
| EP | 1808423 A1 | 7/2007 |
| EP | 2014630 A2 | 1/2009 |
| EP | 3202479 A1 | 8/2017 |
| WO | 2009/075206 A1 | 6/2009 |
| WO | 2016/179130 A1 | 11/2016 |
| WO | 2019/232152 A1 | 12/2019 |

OTHER PUBLICATIONS

International Search Report and Written Opinion of the International Searching Authority; PCT/US19/034562; dated Nov. 12, 2019; 15 Pages; European Patent Office.

Chinese Patent Application No. 201980036710.0, Office Action dated Feb. 8, 2022, 15 pages (8 pages of English Translation and 7 pages of Original copy), Chinese Patent Office.

* cited by examiner

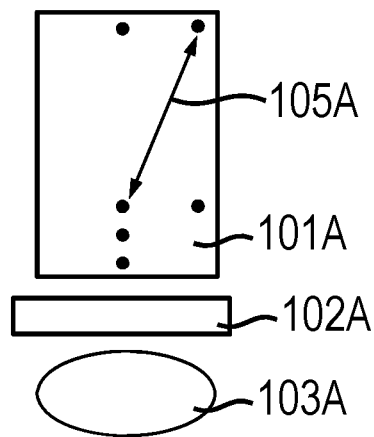
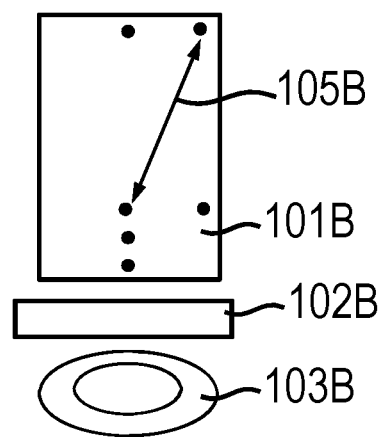
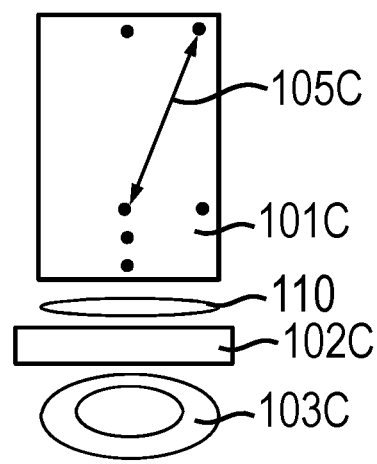
FIG. 5A
PRIOR ART
FIG. 5B
PRIOR ART
FIG. C

HONEYCOMB BODY MANUFACTURING METHODS

This is a national stage application under 35 U.S.C. § 371 of International Application No. PCT/US2019/034562, filed May 30, 2019 which claims the benefit of priority under 35 U.S.C. § 119 of U.S. Provisional Application Ser. No. 62/678,778 filed on May 31, 2018, the content of which is incorporated herein by reference in their entireties.

BACKGROUND

This disclosure generally relates to firing of ceramic or ceramic-forming honeycomb bodies that contain organic materials and graphite as pore-forming materials. The pore-forming materials are removed during the firing process. There is a need to provide improved methods for removing pore-forming materials during firing of honeycomb bodies.

SUMMARY

A first embodiment of this disclosure pertains to a method of firing a ceramic honeycomb body, the method comprising setting a honeycomb body comprising pore-forming materials comprising organic pore-forming material and graphite pore-forming material on a cookie in a furnace containing gases comprising oxygen; placing a layer selected from the group consisting of a graphite layer, a graphite-containing layer, an activated carbon layer, or an amorphous carbon layer between the cookie and the honeycomb body; and heating the honeycomb body to a temperature that burns out and removes at least a portion of the organic pore-forming material and the graphite pore-forming material.

In a second embodiment, the first embodiment comprises the feature that heating the honeycomb body comprises heating the furnace to a temperature of up to 600° C. to remove at least a portion of the organic pore-forming material and heating the furnace to a temperature greater than about 600° C. to remove the graphite pore-forming material.

In a third embodiment, the first or second embodiment comprises the feature that the layer blocks gases in the furnace from flowing through the honeycomb body.

In a fourth embodiment, the first through third embodiments comprise the feature that the layer is oxidized after removal of at least a portion of the organic pore-forming material.

In a fifth embodiment, the layer that has been oxidized in the fourth embodiment does not block furnace gases from flowing through the honeycomb body.

In a sixth embodiment, the first through fifth embodiments comprise the feature that the layer comprises a graphite sheet.

In a seventh embodiment, the first through fifth embodiments comprise the feature that the layer comprises a sheet.

In an eighth embodiment, the first through seventh embodiments comprise the feature that the cookie is placed on a flow-through setter. In a ninth embodiment, the flow-through setter of the eighth embodiment comprises a ring-shaped setter. In a tenth embodiment, the first through ninth embodiments comprise the feature that a second cookie is placed on the honeycomb body. In an eleventh embodiment, the first through the tenth embodiments comprise a second layer selected from the group consisting of a graphite layer, a graphite-containing layer, an activated carbon layer, or an amorphous carbon layer is placed between the honeycomb body and the second cookie.

A twelfth embodiment pertains to a method of firing a honeycomb body, the method comprising heating the honeycomb body comprising a first endface and a second endface and organic pore-forming material and graphite pore-forming material in a furnace containing gases comprising oxygen; and blocking the gases from flowing through the honeycomb body by placing a layer selected from the group consisting of a graphite layer a graphite-containing layer, an activated carbon layer or an amorphous carbon layer adjacent the first endface or the second endface.

In a thirteenth embodiment, the twelfth embodiment further comprises heating the furnace to a first temperature at which the organic pore-forming material is burned out and removed and oxidation of the layer forms a porous layer and heating the furnace to a second temperature that burns out and removes the graphite pore-forming material. In a fourteenth embodiment, the thirteenth embodiment comprises the feature that during heating the honeycomb body to the second temperature burning out the graphite pore-forming material, furnace gases flow through the porous layer and the honeycomb body. In a fifteenth embodiment, the thirteenth or fourteenth embodiment comprises the feature that the first temperature is less than or equal to 600° C. and the second temperature is greater than 600° C.

In a fifteenth embodiment, the twelfth through fourteenth embodiments comprise the feature that the honeycomb body is placed upon the layer disposed upon a cookie. In a seventeenth embodiment, in the cookie is placed upon a setter. In an eighteenth embodiment, the setter comprises a flow-through setter. In a nineteenth embodiment, the setter comprises a ring-shaped setter. In a twentieth embodiment, a second cookie is placed upon the honeycomb body.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

It will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

FIGS. 5A-C schematically depict setter configurations that were utilized for the generation of data in the Examples.

DETAILED DESCRIPTION

Figure 1:
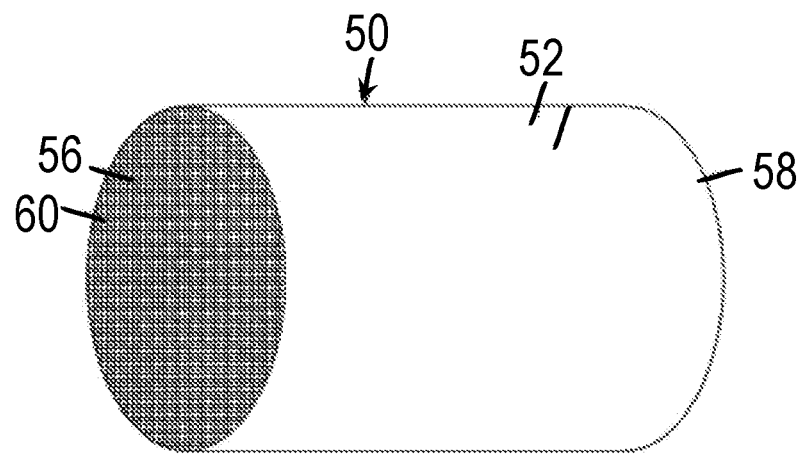
FIG. 1 is a perspective view of a honeycomb body according to one or more embodiments.

Before describing several exemplary embodiments, it is to be understood that the disclosure is not limited to the details of construction or process steps set forth in the following disclosure. The disclosure provided herein is capable of other embodiments and of being practiced or being carried out in various ways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

During firing of honeycomb bodies that contain organic pore-forming material such as starches or polymers and graphite pore-forming material, the organic pore-forming material is typically removed at low temperatures in the firing process (e.g., up to 600° C., or less than or equal to 600° C.). During the removal of the organic pore-forming material, availability of oxygen to the honeycomb bodies should be limited to avoid the rapid burning of organics which leads to thermal runaway and cracking of the honeycomb bodies. The graphite burns at temperatures greater than about 600° C., and graphite is typically burned out at temperatures of about 1000° C. A honeycomb body is less sensitive to cracking at temperatures exceeding 600° C., where the honeycomb body has a lower modulus, a higher strain tolerance, and a lower shrinkage. Non-limiting examples of ceramic materials used to form the honeycomb body include cordierite, mullite, alumina, zirconia and aluminum titanate, silicon carbide, and combinations of two or more thereof. It is desirable to maximize oxygen availability to the honeycomb body during graphite burnout to minimize the time to remove the graphite from the honeycomb body. The graphite removal rate is limited by the mass transport of oxygen to and $CO_2$ from the honeycomb body reaction interface. As used herein, unless otherwise specified, a "ceramic-forming honeycomb body" or "honeycomb body" prior to completion of firing the honeycomb body may comprise, in addition to other constituents, either one or more inorganic ceramic-forming precursor materials or one or more ceramic materials, or both inorganic ceramic-forming precursor materials and ceramic materials, and therefore the honeycomb body can be considered to be an "antecedent ceramic honeycomb body" which then transforms or becomes a fired ceramic honeycomb body after firing, for example via sintering or reactive sintering.

Prior to firing, the honeycomb body is set, which may aid in managing the uniformity of the flow of gas and thermal energy during the firing process. Setting the honeycomb body may, in certain exemplary embodiments, comprise placing the honeycomb body in a furnace such as a retort furnace configured to allow the reacting gases comprising oxygen to uniformly flow through the channels of the honeycomb body, and protecting the exposed sides of the honeycomb body. In additional exemplary embodiments, setting may comprise placing the honeycomb body on at least one diffuser box and protecting the exposed sides of the honeycomb body. In some embodiments, setting may also comprise the use of at least one setter and/or cookie. In some exemplary embodiments, a "cookie" may be a slice of material, such as a thin slice of a ceramic, inorganic cement, or carbon-based honeycomb body or slice of other body such as a honeycomb body having open channels. In other further exemplary embodiments, a "setter" may be an apparatus, such as a slab, on which the honeycomb body is mounted for firing. In some embodiments, the setter is of the same material as the honeycomb body which is being fired. In other embodiments, the honeycomb body is positioned on a setter, which may be on at least one diffuser box.

FIG. 1 illustrates an exemplary embodiment of a honeycomb body 50 shown as a cylindrical shape having a cylindrical outer surface 52, an upstream end face 56 and a downstream end face 58. Honeycomb body 50 has a plurality of fine, parallel gas flow passages or channels 60 formed therein. The gas flow passages or channels 60 are formed by walls and extend through the honeycomb body 50 from upstream end face 56 to downstream end face 58, the passages 60 being unobstructed so as to permit the flow of a fluid, e.g., a gas stream, longitudinally through the honeycomb body 50 via gas flow passages or channels 60 thereof. In some embodiments, the honeycomb body 50 may be in the form of a wall flow filter where the gas flow passages are alternately plugged at the upstream end face 56 and downstream end face 58

Figure 2:
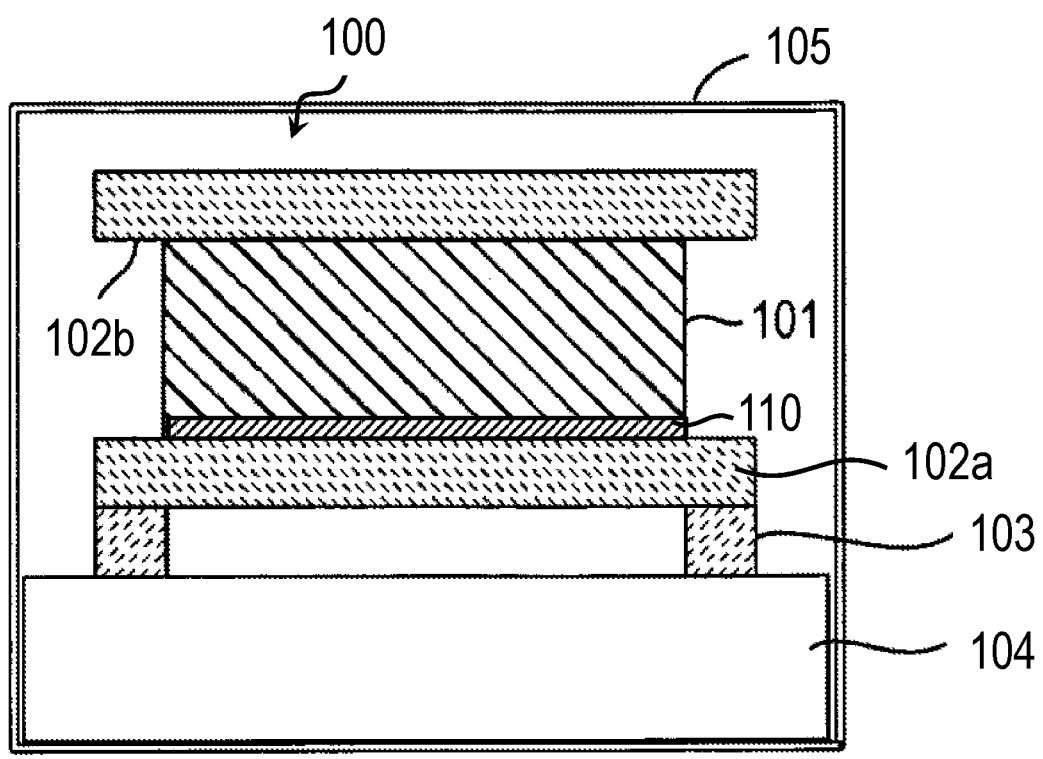
FIG. 2 schematically depicts a setter configuration in preparation for firing a honeycomb body in accordance with at least one exemplary embodiment.

FIG. 2 illustrates an exemplary embodiment of the setter configuration 100. The honeycomb body 101 is placed on a first cookie 102a and a second cookie 102b is placed on top of the honeycomb body 101. In an exemplary embodiment of FIG. 2, the first cookie 102a sits upon a setter 103, which rests upon a diffuser box 104. The setter configuration 100 in FIG. 2 is placed inside a retort furnace 105.

One or more embodiments of the disclosure utilizes a layer 110 selected from the group consisting of a graphite layer, a graphite-containing layer, an activated carbon layer, an amorphous carbon layer, which can comprise a graphite sheet, a graphite-containing sheet, an amorphous carbon sheet or an activated carbon sheet disposed between the first cookie 102a and the honeycomb body 101.

The cookie/layer/honeycomb body stack sits upon a plate or setter 103 that allows furnace gases to the flow through the bottom of the stack. In specific embodiments the setter 103 is a ring-shaped setter, which contains an opening to allow gases to pass therethrough. In other words, the ring-shaped setter is a flow-through setter. A ring-shaped setter comprises an annular ring with an opening therethrough. Other suitable examples of flow-through setters comprise a grid plate with openings therethrough and a crown setter with openings therethrough. In one or more embodiments, a "flow-through setter" is a setter with at least one opening therethrough that allows gas to pass through the setter and a honeycomb disposed above the flow-through setter. At low temperatures (e.g., less than or equal to 600° C.), the layer prevents the flow of furnace gases through the honeycomb body 101, limiting oxygen flux through the honeycomb body and preventing cracking. At higher temperatures (above 600° C.), the layer oxidizes and forms a thin, permeable layer, allowing furnace gases to flow through the honeycomb body 101, increasing oxygen flux through the honeycomb body 101 to aid in graphite removal.

Figure 3:
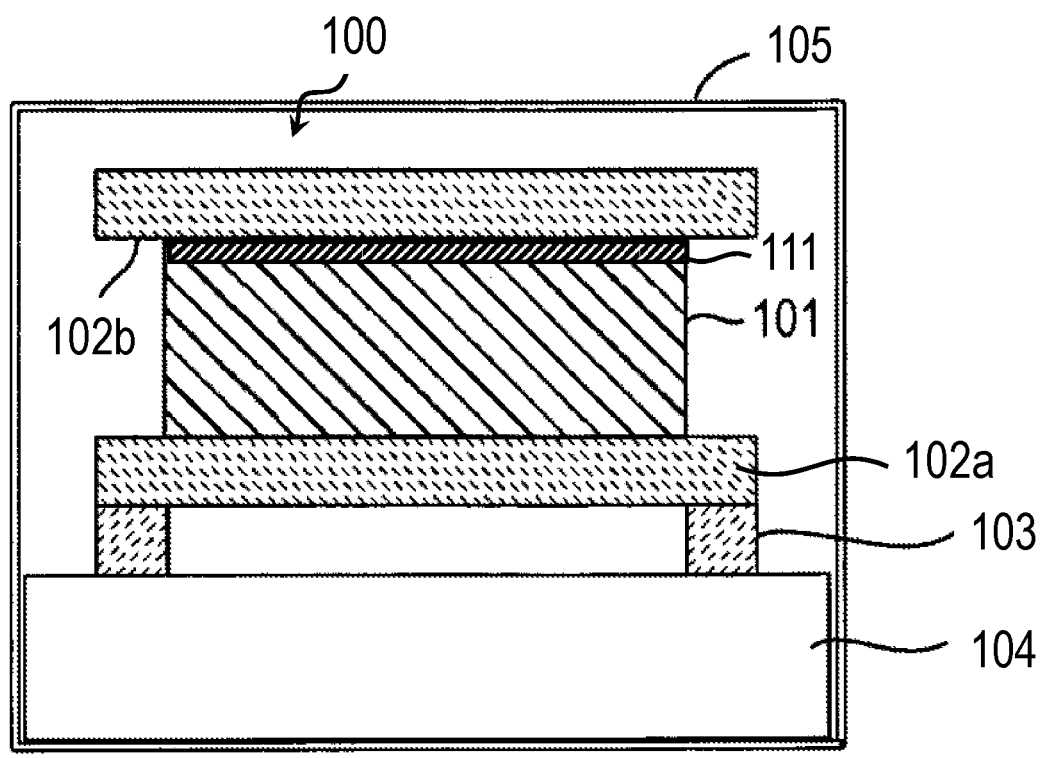
FIG. 3 schematically depicts a setter configuration in preparation for firing a honeycomb body in accordance with at least one exemplary embodiment.

In an alternative embodiment shown in FIG. 3, a layer 110 selected from the group consisting of a graphite layer, a graphite-containing layer, an activated carbon layer, an amorphous carbon layer, which can comprise a graphite sheet, a graphite-containing sheet, an amorphous carbon sheet, or an activated carbon sheet is disposed between the second cookie 102b and the honeycomb body 101. The honeycomb body/layer/cookie stack sits on a plate or setter 103 that allows furnace gases to the flow through the bottom of the stack. In specific embodiments the setter 103 is a ring-shaped setter, which contains an opening to allow gases to pass therethrough. In other words, the ring-shaped setter is a flow-through setter.

Figure 4:
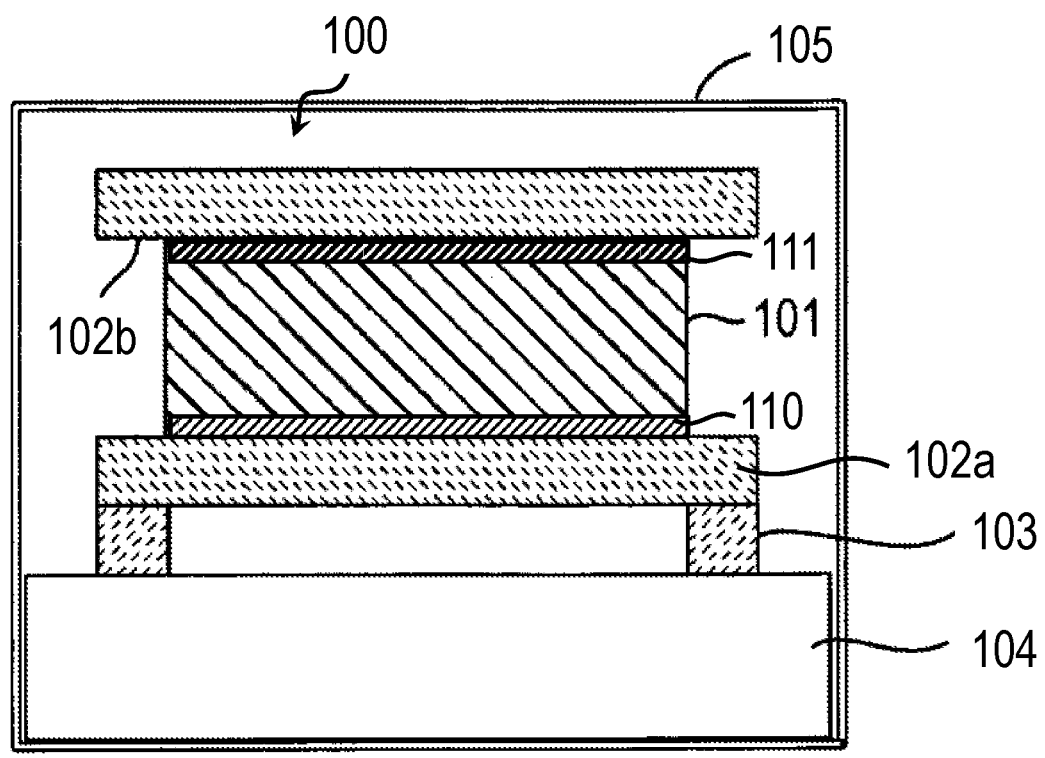
FIG. 4 schematically depicts a setter configuration in preparation for firing a honeycomb body in accordance with at least one exemplary embodiment.

In another alternative embodiment shown in FIG. 4, a layer 110 selected from the group consisting of a graphite layer, a graphite-containing layer, an activated carbon layer, an amorphous carbon layer, which can comprise a graphite sheet, a graphite-containing sheet, an activated carbon sheet, or an amorphous carbon sheet, is disposed between the first cookie 102a and the honeycomb body 101. In addition, a second layer 111 selected from the group consisting of a graphite layer, a graphite-containing layer, an activated carbon layer, an amorphous carbon layer, which can comprise a graphite sheet, a graphite-containing sheet, an activated carbon sheet or an amorphous carbon sheet, is disposed between the second cookie 102b and the honeycomb body 101. The cookie/layer/honeycomb body/cookie stack sits on a plate or setter 103 that allows furnace gases to the flow through the bottom of the stack. In specific embodiments the setter 103 is a ring-shaped setter, which contains an opening to allow gases to pass therethrough. In other words, the ring-shaped setter is a flow-through setter.

In alternative embodiments, a layer selected from the group consisting of a graphite layer, a graphite-containing layer, an activated carbon layer, an amorphous carbon layer, which can comprise a graphite sheet, a graphite-containing sheet, an activated carbon sheet, or an amorphous carbon sheet, could also be wrapped about the circumference of the honeycomb body 101 if an additional boundary from the furnace atmosphere is desired.

According to one or more embodiments of the methods described herein, the methods allow for a reduced firing cycle time compared to processes that do not utilize a layer selected from the group consisting of a graphite layer, a graphite-containing layer, an activated carbon layer, an amorphous carbon layer placed between the honeycomb body and the cookie.

Embodiments of the disclosure utilize a layer selected from the group consisting of a graphite layer, a graphite-containing layer, an activated carbon layer, or an amorphous carbon layer. The layer may be in the form of a sheet such as a graphite sheet, graphite-containing sheet, an activated carbon sheet, or an amorphous carbon sheet disposed between the cookie and the honeycomb body. In one or more embodiments, "graphite-containing" refers to a composite material that contains at least about 50% graphite, at least 60% graphite, at least 70% graphite, at least 80% graphite, at least 90% graphite, at least 95% graphite, or at least 99% graphite by weight. In one or more embodiments that utilize such a sheet as described herein, the sheet has a thickness in a range of from 50 micrometers to 1000 micrometers.

The combination of the honeycomb body, a sheet, a cookie, and a ring-shaped or flow-through setter is then fired in a furnace that contains a minimum of 2.5% oxygen concentration by volume at a temperature less than 500° C. and a minimum of 5% oxygen concentration by volume at a temperature in a range of from 500° C. to 1100° C.

Graphite or carbon begins to oxidize at temperatures greater than 500° C. in the presence of oxygen. The oxidation rate increases with increasing temperature and oxygen content in the furnace. At temperatures less than 500° C., where the risk of rapid, uncontrolled, oxidation of organic binders and starches is greatest, the graphite or carbon sheet provides a barrier to furnace gas flow, limiting the flow of oxygen through the honeycomb body and controlling the removal of the organic pore-forming material. At temperatures greater than about 500° C., the graphite sheet, the graphite-containing sheet, the activated carbon sheet, or the amorphous carbon sheet will oxidize, exposing the bottom face of the honeycomb body to the furnace atmosphere and allowing convective flow of products of combustion of the pore-forming materials through the honeycomb body, as well as eliminating a diffusion barrier on the bottom face of the honeycomb body, resulting in an increase in the rate of graphite removal from the body.

The graphite sheet, the graphite-containing sheet, the activated carbon sheet, or the amorphous carbon sheet may be formed by a variety of methods, including but not limited to, pressing, tape casting, extruding, vapor deposition, rolling, or calendaring. The sheets may contain binders, dispersants, oils, or other materials that benefit the formation of thin sheets. The sheets may be a composite with an inorganic oxide matrix of alumina, silica, or other refractory oxide and graphite pore-former. In alternative embodiments, the sheet may be a film applied directly to the cookie itself to plug its holes or otherwise be combined as cookie/film composite. The cookie holes could be paste-filled using a graphite paste and heavy duty diesel plugger, or could be dipped, sprayed, dunked, or otherwise filled using a slurry coating. It is also possible to cast graphite slurry patties for cookie plugging. All of the cells on one face of the part could be plugged with the graphite slurry, or a special pattern that aligns with the opening in the setter. Both faces could be blocked by a graphite barrier to promote uniform radial removal of organics which could benefit both cracking and part shape.

Thus, according to one or more embodiments, temperatures less than or equal to 600° C., the graphite sheet, the graphite-containing sheet, the activated carbon sheet, or the amorphous carbon sheet prevents the flow of gases in the furnace from flowing through the honeycomb body. Oxygen flux through the honeycomb body is limited, which prevents cracking. At temperatures greater than 600° C., the graphite sheet, the graphite-containing sheet, the activated carbon sheet or the amorphous carbon sheet oxidize, allowing furnace gases to flow through the honeycomb body, increasing oxygen flux through the honeycomb body to aid in graphite pore-forming material removal. In one or more embodiments, the setter configuration is a dynamic setter configuration, and one of the components of the setter configuration, the graphite layer or graphite-containing layer, is dynamic, blocking furnace gases from flowing through the honeycomb body during a first pore-forming material burnout phase, and not blocking furnace gases from flowing through the honeycomb body during a second pore-forming material burnout phase. In one or more embodiments, a dynamic setter comprises a flow-through setter as defined herein combined with a graphite sheet or graphite-containing sheet that acts as barrier that can restrict the mass transport of oxygen through the channels while the organic pore-forming material is being removed from the honeycomb body, avoiding a "chimney effect" which may drive thermal runaways and cracking in honeycomb bodies with high organic content. This barrier then decomposes, allowing for oxygen and heat convection through the honeycomb body, to promote graphite pore-forming material removal at higher temperatures. In some embodiments, at least a portion of the barrier decomposes after the organic binders, oils, and pore-forming materials have been burned out.

This process configuration according to embodiments of the disclosure may also lead to an improvement in physical property uniformity of the fired honeycomb bodies. Delayed graphite burnout can lead to a disruption in the property formation of a cordierite honeycomb body. Allowing flow through the honeycomb body is expected to result in a more robust process window for graphite removal. While the present disclosure and claims are not to be limited by a theory or principle, it is believed that this improvement is achieved as a result of convective flow of the oxygen from the kiln atmosphere to the center of the part, as well as the flow of CO and $CO_2$ from the center of the part into the kiln atmosphere, rather than diffusion limited flow into and out of the parts when one end of the filter is completely blocked to gas flow. Additionally, in current process configurations which do not utilize a graphite sheet, graphite-containing sheet, activated carbon sheet or amorphous carbon sheet between the honeycomb body and the cookie, there is within-part property variability imparted in large cordierite honeycomb wall-flow filters as a result of heat being trapped in the core of the honeycomb body during the cordierite formation exotherm. Allowing flow of furnace gas though the honeycomb body during cordierite formation could reduce the amount of heat buildup, reducing the physical property differences between the core and the skin on the honeycomb body. As used herein a "sheet" refers to an at least loosely cohesive piece of material.

Aluminum titanate honeycomb bodies could also benefit from within-part property uniformity. The reaction sequence to form $AlTi_2O_5$ may or may not go through an intermediate step of forming $SrTiO_3$. The thermodynamic stability of this phase is dependent on $pO_2$ (partial pressure of oxygen), which could differ between skin and core and, thus, may be managed for uniform properties.

According to various embodiments, the setter configuration, including the honeycomb body, is placed in an apparatus for firing, such as a furnace. In some embodiments, the furnace may be a small retort chamber or a large retort chamber. Firing may be done by any method known to those of skill in the art. According to various exemplary embodiments, firing may comprise heating the honeycomb body and may optionally further comprise flowing at least one inert or oxidizing gas through the honeycomb body. The honeycomb body may be fired to achieve heat treatment and/or oxidation of the honeycomb body.

According to one or more embodiments, the honeycomb body may be fired by heating with process gas flow. The amount of process gas flow through the honeycomb body may, for example, be adjusted by input gas flow rates and/or amount of exhaust gas vented. In certain embodiments, process gas flow temperature may be controlled by managing the furnace temperature ramp rate. The appropriate temperature, furnace ramp rate, process gas flow rate, and/or length of soak time in the process gas(es) may be determined by those of skill in the art, and may be determined at least in part based upon the properties desired in the final product. For example, process temperatures up to about 1000° C. may be used, with soak times often ranging from a few minutes to many hours. "Soak time" refers to the period of time the furnace is held at an elevated temperature during the firing process. In addition, the temperature, furnace ramp rate, process gas flow rate, and/or length of soak time may be dependent upon one another. For example, when the temperature of the firing or gas flow rate is higher, the length of soaking may be shorter, or when the temperature or gas flow rate is lower, the length of soak time may be greater, etc. One of skill in the art may, in certain embodiments, choose the temperature, length of firing, and soak time based upon other variables as well, and these determinations are well within the ability of those skilled in the art to make.

In some embodiments, the methods comprise heat treatment and/or controlled oxidation of at least one honeycomb body, wherein the process gas flows through the passages or channels of the honeycomb body from the inlet end to the outlet end in a controlled fashion, such as being blocked or partially blocked, and then allowed at a subsequent time.

EXAMPLES

Experiments were conducted with honeycomb bodies 101A, 101B and 101C shown in FIGS. 5A, 5B and 5C respectively. All three honeycomb bodies represented in FIGS. 5A, 5B and 5C were the same size; 13 inches tall and 13 inches in diameter, and of the same composition; 15 weight % pore-former (starch and graphite combined) at about 3:1 starch to graphite ratio. Additionally these parts include organic binder at about 3.5 wt % which burns out during the debind region of the cycle. The honeycomb bodies 101A, 101B, and 101C were 200/8 (200 cells per square inch, 203 micrometers (8 mil) thick walls) thin wall filters. In the schematic representation shown in FIG. 5A, honeycomb body 101A was placed upon cookie 102A, which was placed upon 9-inch diameter silicon carbide disc-shaped setter 103A. The cookie 102A was a thin piece of honeycomb body, approximately 0.75 inches thick, having the same composition as the honeycomb body 101A. Honeycomb body 101A comprises 10% by weight pore-forming material comprising starch and graphite in a range of about 3:1 to 1:1 starch to graphite. Thermocouple 105A was placed on the honeycomb body 101A to monitor temperature. FIG. 5A represents a prior art setter configuration.

FIG. 5B schematically represents a second prior art setter configuration in which honeycomb body 101B was placed upon cookie 102B, which was a thin piece of honeycomb body, approximately 0.75 inches thick, having the same composition as the honeycomb body 101B. The setter 103B in FIG. 5B was a silicon carbide a ring-shaped setter having an outer diameter of 9 inches and an inner diameter or 4 inches, having an opening to allow gases to pass therethrough. In other words, the ring-shaped setter is a flow-through setter made of silicon carbide with an outer diameter of 9 inches, an inner diameter of 4 inches and approximately 0.45 inches thick. Thermocouple 105B was placed on the honeycomb body 101B to monitor temperature.

FIG. 5C represents a setter configuration as disclosed herein in which honeycomb body 101C was placed upon cookie 102C, which was a thin piece of honeycomb body, approximately 0.75 inches thick, having the same composition as the honeycomb body 101C. The setter 103C in FIG. 5C was a silicon carbide a ring-shaped setter having an outer diameter of 9 inches and an inner diameter or 4 inches, having an opening to allow gases to pass therethrough. In other words, the ring-shaped setter is a flow-through setter made of silicon carbide with an outer diameter of 9 inches, an inner diameter of 4 inches and approximately 0.45 inches thick. In FIG. 5C, a thin graphite sheet 110, 4" square 0.033 inches thick sheet of graphite was placed between the cookie 102C and the honeycomb body 101C over the opening in the ring-shaped setter 103C. Thermocouple 105C was placed on the honeycomb body 101C to monitor temperature.

Figure 6A:
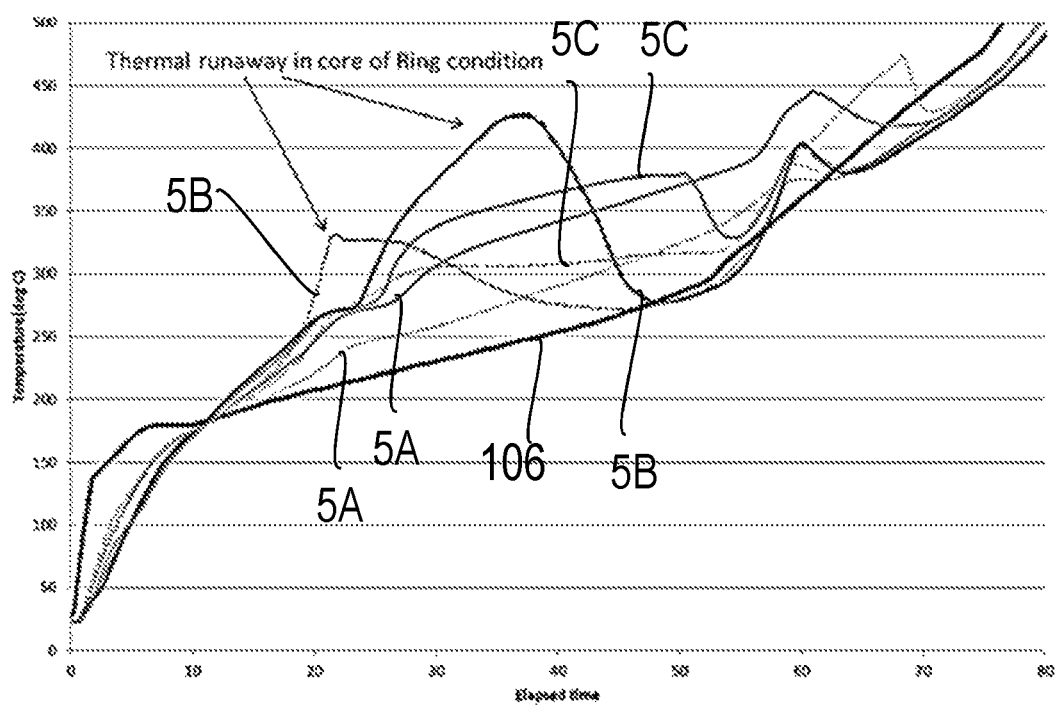
FIGS. 6A and 6B are graphs of data from the Examples showing the temperature profiles of the honeycomb bodies in the setter configurations of FIGS. 5A-C.
Figure 6B:
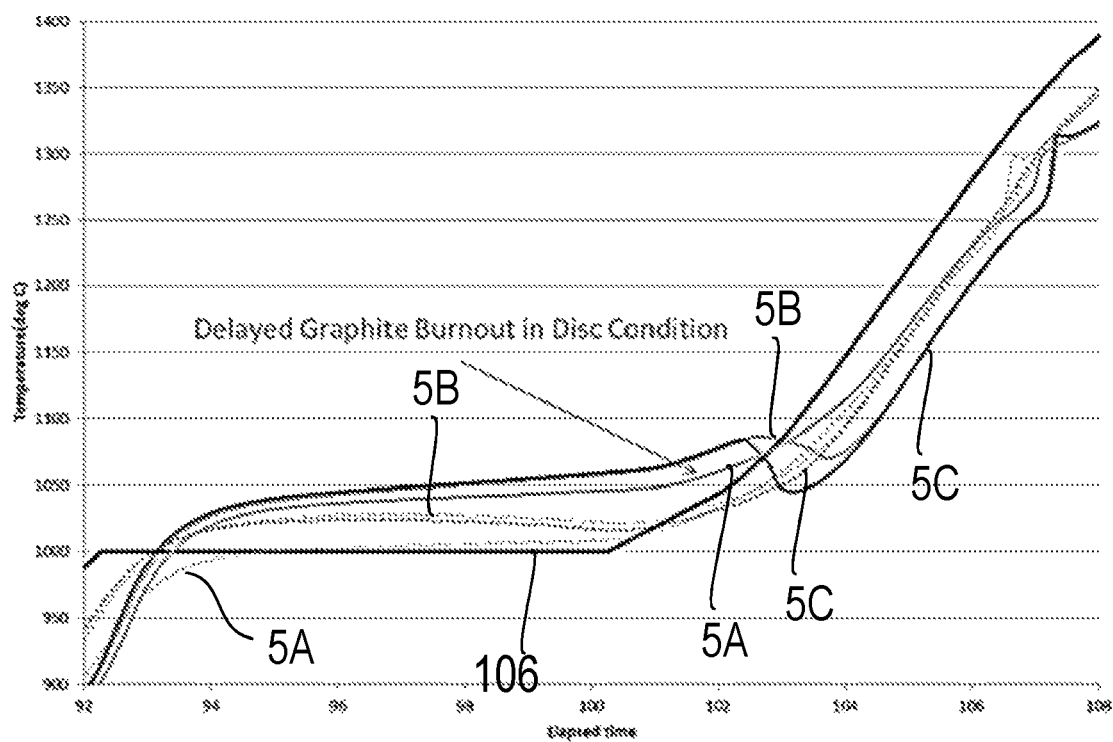

Two thermocouples (1 for thermocouple data and 1 for crack read) were used for each of the setter configurations in FIGS. 5A, 5B and 5C that were heated according to the temperature set point 106 shown in FIGS. 6A and 6B. The part fired on a ring without the barrier (labeled 5B) exhibited a thermal runaway during debind (see FIG. 6A between 20 to 30 hours), cracking the ware, and the part fired on the disc (labeled 5A) had an extended graphite burnout period that did not show signs of completion prior to the property formation region starting around 1150° C.

The thermocouple data for the dynamic setter configuration (ring-shaped setter and graphite sheet) in accordance with an embodiment of this disclosure showed a faster organic burnout than the disc-shaped setter 5A. While the disclosure shall not be limited by a theory, this faster reaction may be a result of the graphite barrier being similar in size to the inner diameter of the ring, allowing some flow through the ware at low temperatures. It is believed that this impact could be mitigated by using a wider barrier to more effectively block the flow of kiln gases through the part during the organic burnout stage, or taken advantage of as a means to reduce the cycle length, as a result of the increased rate of organic removal. The graphite burnout time for the dynamic setter (5C) is similar to that of the part on a ring (5B), though it may take slightly longer as the graphite film takes time to oxidize before the kiln atmosphere can flow through the part. Overall, this dynamic setter shows potential for cycle reduction for products that contain both starch and graphite as pore-formers.

It will be apparent to those skilled in the art that various modifications and variations can be made without departing from the spirit or scope of the disclosure.

What is claimed is:

1. A method of firing a honeycomb body, the method comprising:
    setting a ceramic-forming honeycomb body comprising pore-forming materials comprising organic pore-forming material and graphite pore-forming material on a cookie in a furnace containing gases comprising oxygen;
    placing a layer selected from the group consisting of a graphite layer, a graphite-containing layer, an activated carbon layer, or an amorphous carbon layer between the cookie and the honeycomb body; and
    heating the honeycomb body to a temperature that burns out and removes at least a portion of the organic pore-forming material and the graphite pore-forming material,
    wherein the layer is configured to block gases from flowing through the honeycomb body when the honeycomb is heated to the temperature that burns out and removes the portion of the organic pore-forming material.

2. The method of claim 1 wherein heating the honeycomb body comprises heating the furnace to a temperature of up to 600° C. to remove at least a portion of the organic pore-forming material and heating the furnace to a temperature greater than 600° C. to remove the graphite pore-forming material.

3. The method of claim 2 wherein the layer blocks gases in the furnace from flowing through the honeycomb body.

4. The method of claim 2 wherein the layer is oxidized after removal of at least a portion of the organic pore-forming material.

5. The method of claim 4 wherein the layer that has been oxidized does not block furnace gases from flowing through the honeycomb body.

6. The method of claim 1 wherein the layer comprises a graphite sheet.

7. The method of claim 1 wherein the layer comprises a sheet.

8. The method of claim 1 wherein the cookie is placed on a flow-through setter.

9. The method of claim 8 wherein the flow-through setter comprises a ring-shaped setter.

10. The method of claim 9 wherein a second cookie is placed on the honeycomb body.

11. The method of claim 10 wherein a second layer selected from the group consisting of a graphite layer, a graphite-containing layer, an activated carbon layer, or an amorphous carbon layer is placed between the honeycomb body and the second cookie.

12. A method of firing a honeycomb body, the method comprising:
    heating a ceramic-forming honeycomb body comprising a first endface and a second endface and organic pore-forming material and graphite pore-forming material in a furnace containing gases comprising oxygen; and
    blocking the gases from flowing through the honeycomb body by placing a layer selected from the group consisting of a graphite layer, a graphite-containing layer, an activated carbon layer or an amorphous carbon layer adjacent the first endface or the second endface.

13. The method of claim 12 further comprising heating the furnace to a first temperature sufficient to burn out and remove the organic pore-forming material and heating the furnace to a second temperature that burns out and removes the graphite pore-forming material.

14. The method of claim 13 wherein during heating the honeycomb body to the second temperature burning out the graphite pore-forming material, furnace gases flow through the layer and the honeycomb body.

15. The method of claim 14 wherein the first temperature is less than or equal to 600° C. and the second temperature is greater than 600° C.

16. The method of claim 14 wherein the honeycomb body is placed upon the layer disposed upon a cookie.

17. The method of claim 16 wherein the cookie is place upon a setter.

18. The method of claim 17 wherein the setter comprises a flow-through setter.

19. The method of claim 18 wherein the flow-through setter comprises a ring-shaped setter.

20. The method of claim 18 wherein a second cookie is placed upon the honeycomb body.

* * * * *